United States Patent
Yamamura

(10) Patent No.: US 7,458,234 B2
(45) Date of Patent: Dec. 2, 2008

(54) ELONGATING METHOD OF OPTICAL FIBER BASE MATERIAL

(75) Inventor: Waichi Yamamura, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/593,274

(22) PCT Filed: Mar. 7, 2005

(86) PCT No.: PCT/JP2005/003917
§ 371 (c)(1),
(2), (4) Date: Sep. 18, 2006

(87) PCT Pub. No.: WO2005/090246
PCT Pub. Date: Sep. 29, 2005

(65) Prior Publication Data
US 2007/0137258 A1 Jun. 21, 2007

(30) Foreign Application Priority Data
Mar. 18, 2004 (JP) .............................. 2004-078632

(51) Int. Cl.
C03B 37/02 (2006.01)
C03B 37/025 (2006.01)
(52) U.S. Cl. ............................. 65/435; 65/404; 65/477; 385/123
(58) Field of Classification Search ..................... 65/404
See application file for complete search history.

(56) References Cited

U.S. PATENT DOCUMENTS 5,354,348 A * 10/1994 Zushi et al. .................... 65/423
6,742,363 B1 * 6/2004 Yamamura et al. ............ 65/377
7,170,603 B2 * 1/2007 Katayama ................... 356/399

FOREIGN PATENT DOCUMENTS

| JP | 8-208260 | | 8/1996 |
|----|----------|---|--------|
| JP | 9-249428 | | 9/1997 |
| JP | 2000-219530 | * | 8/2000 |
| JP | 2000219530 A | * | 8/2000 |

* cited by examiner

*Primary Examiner*—Sung Pak
*Assistant Examiner*—Chad H Smith
(74) *Attorney, Agent, or Firm*—McGinn IP Law Group PLLC

(57) ABSTRACT

There is provided an elongating method of an optical fiber base material which can easily correct a distorted portion of an optical fiber base material with it being possible to elongate the optical fiber base material to reduce its diameter. According to such an elongating method, in an elongating process of elongating an optical fiber base material by heating the optical fiber base material in a heating furnace so that a diameter of the optical fiber base material is reduced, before the optical fiber base material is elongated from an end thereof, a distorted portion of the optical fiber base material is connected by being heated to be softened in the heating furnace. To do so, the optical fiber base material is attached to a hanging mechanism so as to be hung in an electric furnace, the distorted portion of the optical fiber base material is heated to be softened. The elongation is stated after a difference between the elongation axis and an end of one of the optical fiber base material and the dummy rod attached to the optical fiber base material is reduced to be 10 mm or less. Here, the difference may be detected by using a noncontact position detecting apparatus, which may be one of a laser measuring device and an image processing apparatus.

15 Claims, 5 Drawing Sheets

ELONGATING METHOD OF OPTICAL FIBER BASE MATERIAL

TECHNICAL FIELD

The present invention relates to an elongating method of elongating an optical fiber base material having a large outer diameter so that the outer diameter is reduced to be suitable for drawing. More particularly, the present invention relates to an elongating method of an optical fiber base material whereby an operation at the beginning of the elongating procedure can be performed easily and reliably and an optical fiber base material with reduced distortion can be obtained. Here, the present invention relates to the Japanese Patent Application identified below. The contents of the following patent application are incorporated herein by reference, if applicable.

Japanese Patent Application 2004-078632
Filed on Mar. 18, 2004

BACKGROUND ART

In recent years, advancement of the manufacturing technique of optical fiber base materials has increasingly enabled optical fiber base materials with a large outer diameter to be manufactured. To draw such optical fiber base materials with a large outer diameter into optical fibers having an outer diameter of 125 μm, the established drawing technique requires a considerable change. For example, a heating furnace of a larger size is required, and the drawing technique needs to be improved.

Considering the above problem, optical fibers are manufactured by using the following exemplary methods. An optical fiber base material with a large outer diameter manufactured by using the typical vapor phase axial deposition (VAD) method is first elongated so that the diameter is reduced to be substantially equal to the diameter of a typically-used optical fiber base material for drawing. This elongated optical fiber base material is drawn into an optical fiber. Alternatively, an optical fiber base material with a large outer diameter manufactured by using the VAD method is elongated so that the diameter is reduced. Subsequently, glass particles are deposited on the elongated optical fiber base material by using the outside vapor deposition (OVD) method, and the resulting optical fiber base material is drawn.

The above methods include a step of dehydrating a porous base material manufactured by depositing glass particles in a heating furnace and vitrifying the porous base material into a transparent glass. The vitrification step is normally performed in such a manner that while rotating, the porous base material is slowly moved through a furnace core tube the temperature of which is maintained at 1,000° C. to 1,650° C. Specifically speaking, the porous base material is hung such that the lower end portion of the porous base material is positioned in the vicinity of the heating source of the heating furnace. After the heating source is heated to the temperate at which the vitrification takes place, the porous base material is gradually moved down while being rotated. In this way, the vitrification proceeds from the lower end portion of the porous base material to the upper end portion.

When the porous base material is vitrified into a transparent glass, the density greatly changes in a portion of the porous base material which first experiences the vitrification. This may considerably affect the shape of the optical fiber base material obtained as a result of the vitrification depending on the position of the center of the rotation, the temperature distribution, the shape and the like. The obtained optical fiber base material may have a distorted portion as shown in FIG. 1.

DISCLOSURE OF THE INVENTION

[Problems to be Solved by the Invention]

The above-mentioned optical fiber base material is obtained by heating a compound base material made up of a porous soot and a core rod in a heating furnace. Therefore, the optical fiber base material may show considerable distortion in its end portion that corresponds to a portion of the porous base material which is first sintered and vitrified into a t parent glass.

The optical fiber base material having a locally distorted portion at its end is typically corrected by means of a glass lathe or the like. The correcting process using a glass lathe is performed by using a gas burner as a heating source, which allows for local heating. Therefore, the correcting process can be performed only on the distorted portion, and is reliably applicable if the optical fiber base material has an outer diameter of 100 mm or less, particularly 80 mm or less.

However, if the outer diameter of the optical fiber base material is larger, the size of the taper end portion of the optical fiber base material is accordingly larger. In this case, the correcting process using a glass lathe can not be used to correct the distortion because thermal power from the burner is insufficient, or an extremely long time period is required for heating.

Also, if a dummy rod provided in the vicinity of the end portion of the optical fiber base material and the taper end portion of the optical fiber base material are distorted as a result of the vitrification, the following problems emerge. In the elongating process, the dummy rod, which is held so as to project from the lower end of the heating furnace, is elongated. To do so, the dummy rod is fixed by a chuck or roller positioned directly below the heating furnace. Here, the optical fiber base material may not be aligned with the center of the heater included in the heating furnace because of the distortion. In the worst case, the optical fiber base material may be in contact with the heater. Another problem is that the dummy rod may break when forced to be held by the chuck or roller for the elongating process since the axial line of the dummy rod is distorted.

To prevent the dummy rod from breaking, many efforts have been made, and a chuck has been developed which can hold the dummy rod whose axial line is distorted without breaking it In the case of elongation by means of a roller, however, such a mechanism for correcting distortion can not be used.

An advantage of some aspects of the present invention is to provide an elongating method of an optical fiber base material which can easily correct a distorted portion of an optical fiber base material with it being possible to elongate the optical fiber base material to reduce its diameter.

[Means for Solving the Problems]

An aspect of the invention provides an elongating method of an optical fiber base material. According to the elongating method, in an elongating process of elongating an optical fiber base material by heating the optical fiber base material in a heating furnace so that a diameter of the optical fiber base material is reduced, before the optical fiber base material is elongated from an end thereof a distorted portion of the optical fiber base material is corrected by being heated to be softened in the heating furnace.

Here the optical fiber base material is attached to a hanging mechanism so as to be hung in the heating furnace. Here, the optical fiber base material is hung in such a manner that the distorted portion is positioned lower and the elongation axis is substantially parallel to a plumb direction. Then, the distorted portion of the optical fiber base material is heated to be softened. Here, the temperature of a heater for heating the heating furnace preferably falls within the range of 1800° C. and 1900° C. Here, the elongation is started after a difference between the elongation axis and one of the optical fiber base material and a dummy rod attached to the optical fiber base material is reduced to be no more than a predetermined value. Here, the elongation may be started after a difference between an elongation axis and an end of one of the optical fiber base material and a dummy rod attached to the optical fiber base material is reduced and judged to be 10 mm or less, for example. Here, the different may be a difference between the elongation axis and the end of the dummy rod, and the elongation is started after the difference is reduced to be 10 mm or less, for example.

The difference may be detected by using a noncontact position detecting apparatus. Here, the noncontact position detecting apparatus may be one of a laser measuring device and an image processing apparatus. Furthermore, the elongating method according to the embodiment of the invention may further include examining whether the optical fiber base material is to be hung in the heating furnace without being in contact with the heating furnace, before the optical fiber base material is hung.

[Effects of the Invention]

According to a manufacturing method of an optical fiber base material relating to an aspect of the invention, a distorted portion of an optical fiber base material can be corrected while the optical fiber base material is held by a heating furnace for elongation. In other words, when a dummy rod is held for elongation, the distorted portion of the optical fiber base material has already been corrected and the correction has been confirmed. Therefore, the dummy rod does not receive an external force caused by the distorted portion and thus does not break. Furthermore, it is not necessary to use a chuck specially designed to allow for distortion of the central axis of the dummy rod.

Having a relatively small outer diameter, the distorted portion can be softened to be corrected at a temperature slightly lower than a temperature necessary to soften the straight body part of the optical fiber base material having a large outer diameter. Therefore, the temperature is not too high when the elongating process of the optical fiber base material arts after the distorted portion is corrected. For this reason, the straight body part can be elongated very reliably.

In addition, the optical fiber base material is elongated after the distorted portion is corrected according to the elongating method relating to an aspect of the invention. Consequently, an optical fiber base material of a smaller outer diameter obtained as a result of the elongation has reduced distortion.

Also, the optical fiber base material is hung with the distorted portion positioned lower. With this configuration, the distance between the elongation axis and the distorted portion is smaller when compared with a case where the optical fiber base material is hung with the distorted portion positioned higher. This can contribute to reduction in size of the heating furnace. Additionally, since it is examined whether the optical fiber base material is going to be in contact with the heating furnace before the optical fiber base material is hung, breakage of the dummy rod can be avoided.

BEST MODE FOR CARRYING OUT THE INVENTION

Figure 1:
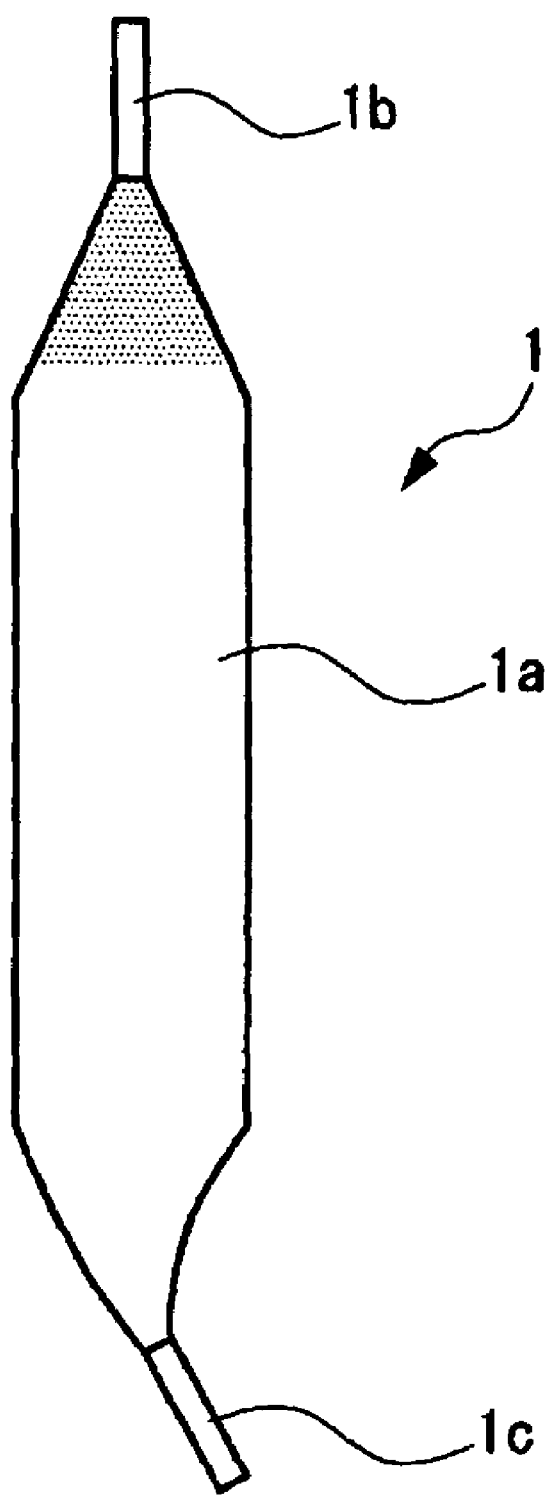
FIG. 1 is a schematic side view illustrating an example of an optical fiber base material having a distorted end portion.

Hereinafter, an embodiment of the present invention will be described The embodiment does not limit the invention according to the claims, and all the combinations of the features described in the embodiments are not necessarily essential to means provided by the invention.

According to an embodiment of the invention, an optical fiber base material with a large outer diameter is manufactured by using a typical method, vitrified into a transparent glass, and measured in terms of its shape. If a portion of the optical fiber base material which first experiences vitrification (one of the end portions) is distorted, it is then judged whether the optical fiber base material can be placed in a heating furnace without causing a problem based on the degree of the distortion and the space within the heating furnace. If judged in the affirmative, the optical fiber base material is placed such that the distorted portion is positioned in substantially the center of a heater. In detail, the distorted portion is positioned in an area which reaches the highest temperature within the heating furnace, generally speaking, substantially the center of the heater or slightly higher than the center of the heater.

For the elongating process, an elongation support rod made of heat-resistant ceramics is connected to a dummy rod that is provided at the lower end of the optical fiber base material. This connection is realized, for example, by fitting the elongation support rod and dummy rod with each other and mechanically coupling them together using a pin or the like. Here, the dummy rod and elongation support rod may be coupled to each other with a little allowance therebetween. Such an allowance is effective in placing an optical fiber base material with a highly distorted portion in a heating furnace. At this stage, the elongation support rod is not held by a chuck or roller for elongation yet. Therefore, the lower end of the elongation support rod is freely hanging.

Now, the optical fiber base material having a large outer diameter is heated, so that the distorted portion is softened. As a result, the distorted portion can be corrected by its own weight After this, it is examined whether the distorted portion is corrected or not Specifically speaking it is judged whether the difference between the end of the dummy rod and the elongation axis is 10 mm or less. Subsequently, an elongation rod made of aluminum is further attached to the lower end of the elongation support rod in order to start elongating the optical fiber base material. Here, the method to examine whether the distorted portion has been corrected may include visual observation of the position of the dummy rod which projects from the lower end of the heating furnace. More preferably, however, the difference between the end of the dummy rod and the elongation axis may be easily detected by using a noncontact positing detection apparatus such as a laser measuring device and an image processing apparatus including CCD cameras. With the use of such equipment, the process can be automated.

The following part describes the embodiment of the invention in more detail with reference to the attached drawings. The following explains a method of elongating the optical fiber base material with a large outer diameter shown in FIG. 1. An optical fiber base material 1 includes a base material 1a and dummy rods 1b and 1c. The base material 1a has a large outer diameter of 40 mm to 180 mm, and is formed by a rod-like quartz glass. The dummy rods 1b and 1c are welded and connected to the different ends of the base material 1a. The dummy rods 1b and 1c are formed by a quartz glass or the like. The upper end of the optical fiber base material 1 is to be coupled to a hanging support rod 2 made of silicon nitride ceramics.

Figure 2:
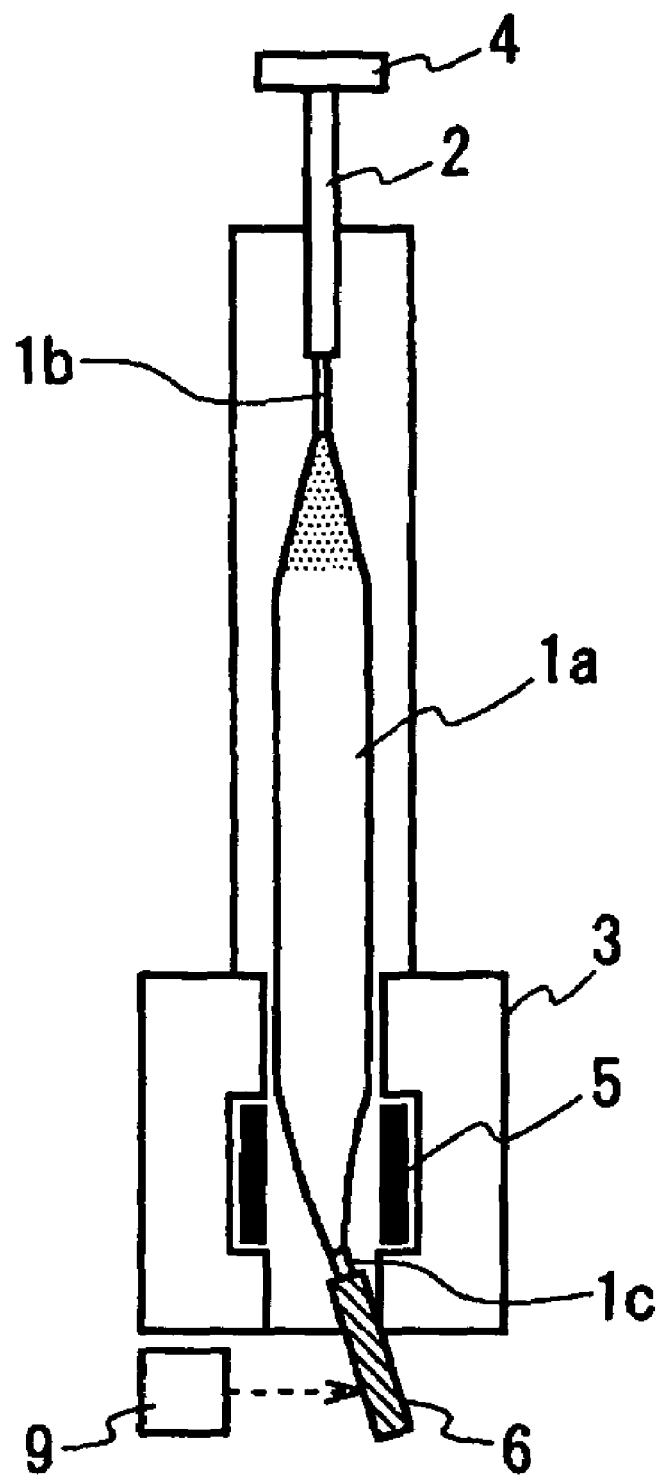
FIG. 2 is a schematic vertical cross-sectional view illustrating that an optical fiber base material having a distorted end portion is attached to an elongating apparatus.

The elongating process is described below. To begin with, it is judged whether the optical fiber base material 1 can be hung without being in contact with a heating furnace 3, before the optical fiber base material 1 is actually hung. This is judged on the basis of the distance between the elongation axis and the internal wall of the heating furnace 3, for example. If distortion of the optical fiber base material 1 is judged to be small enough to enable the optical fiber base material 1 to be hung without a problem, the optical fiber base material 1 is attached to a base material hanging mechanism 4 via the hanging support rod 2 to be hung, and inserted into the heating furnace 3 such that the distorted lower end portion of the optical fiber base material 1 is positioned at a predetermined location. FIG. 2 shows that the optical fiber base material 1 is attached to the elongating apparatus. Here, the elongation axis indicates a plumb line obtained when a spindle attached to the support rod 2 or hanging mechanism 4 is hung so as to go through the center of the heating furnace 3. In this embodiment, the optical fiber base material 1 is hung such that the distorted portion is positioned lower.

Referring to FIG. 2, the dummy rod 1c at the lower end of the optical fiber base material 1 may not project from a heater 5 of the heating furnace 3. If such is the case, the optical fiber base material 1 may be attached to the elongating apparatus after an elongation support rod 6 made of silicon nitride ceramics is attached to the dummy rod 1c. Alternatively, the optical fiber base material 1 is moved down to such an extent that the dummy rod 1c projects from the heating furnace 3, the elongation support rod 6 is attached, and the optical fiber base material 1 is then positioned back at the predetermined location in the heating furnace 3.

Figure 3:
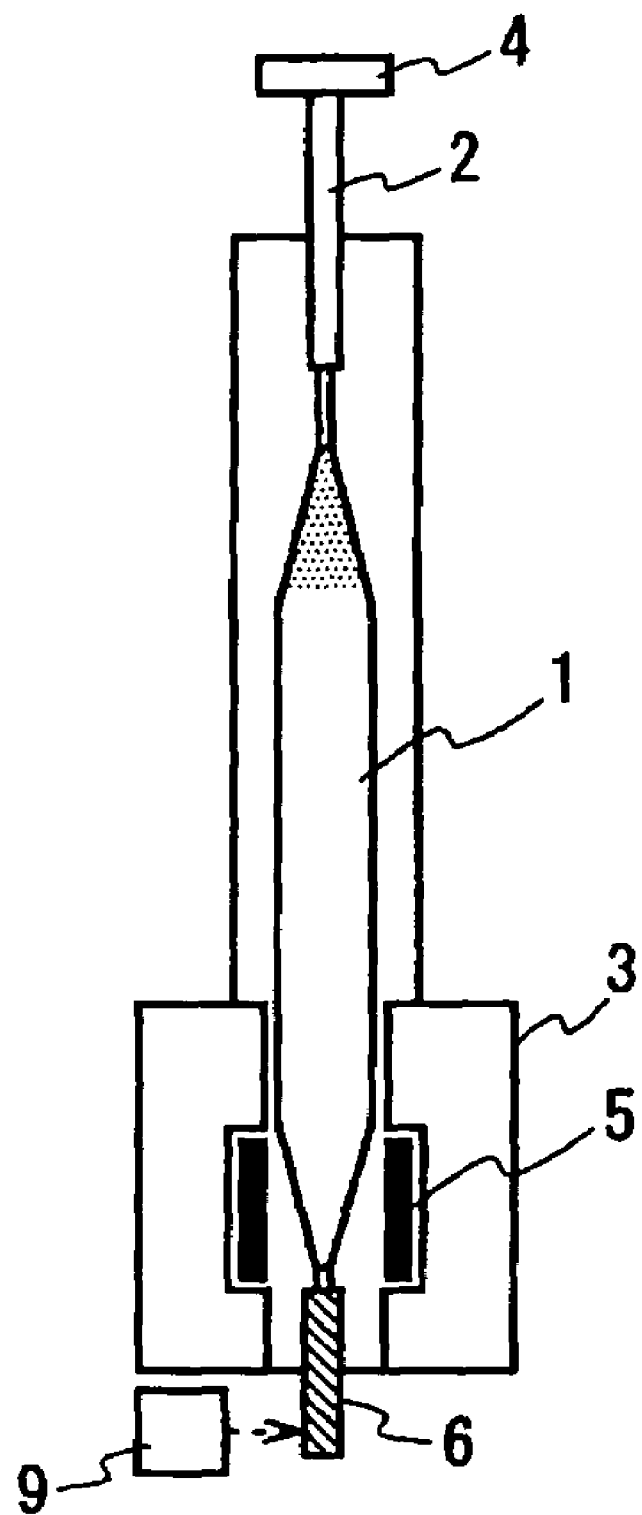
FIG. 3 is a schematic vertical cross-sectional view illustrating that a distorted end portion of an optical fiber base material has been corrected.

After this, heating is started. When heated to a range of 1,800° C. to 1,900° C., the heater 5 is temporarily suspended from being heated or heated at a lower rate of temperature increase. When the heated portion of the optical fiber base material 1 softens, the distorted portion slowly starts to be corrected by the weight of glass forming the lower end portion of the optical fiber base material 1 and the support rod 6 hanging from the lower end portion. FIG. 3 shows that the distorted lower end portion of the optical fiber base material 1 has been corrected.

Subsequently, it is judged whether the distortion has been corrected, with the use of a noncontact position detecting apparatus 9. In this embodiment, this judgment is made by examining whether the difference between the dummy rod 1c and the elongation axis is reduced to a predetermined value or smaller as a result of the correction. When a laser measuring device is used for the noncontact position detecting apparatus 9 for example, the laser measuring device measures a distance to the elongation axis in advance. The laser measuring device detects a distance to the dummy rod 1c, to obtain the difference between the dummy rod 1c and the elongation axis based on the distance measured in advance. Here, the distance to the dummy rod 1c may be a distance from a desired feature point, for example the end, of the dummy rod 1c to the elongation axis. For example, while the optical fiber base material 1 is rotated, the laser measuring device successively detects the distance to the end of the dummy rod 1c. The difference between the maximum among the successively detected values and the distance to the elongation axis obtained in advance is calculated as the difference between the dummy rod 1c and the elongation axis.

Here, the noncontact position detecting apparatus 9 may be an image processing apparatus. If such is the case, the image processing apparatus measures the position of the elongation axis on an image in advance, and obtains an image of the dummy rod 1c in a direction perpendicular to the elongation axis of the optical fiber base material 1. The image processing apparatus subjects the obtained image to image processing, and calculates the distance between the feature point of the dummy rod 1c and the elongation axis.

Figure 4:
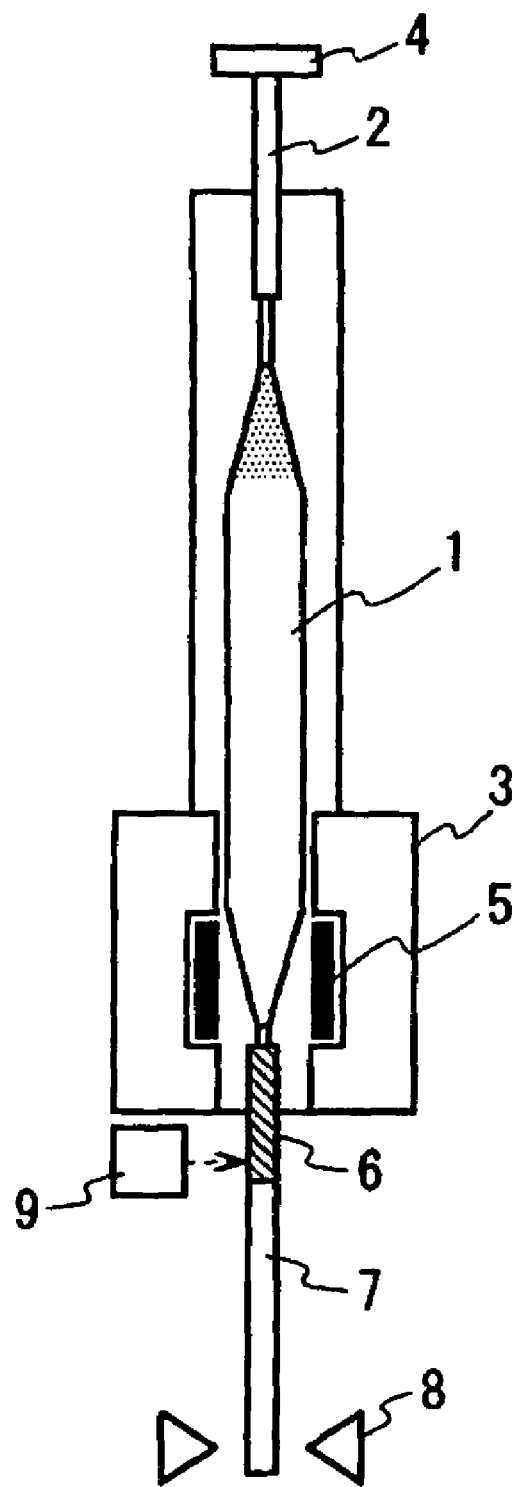
FIG. 4 is a schematic vertical cross-sectional view illustrating that an elongating rod is attached to a support rod provided at a lower end of an optical fiber base material.

Subsequently, an aluminum elongation rod 7 is attached to the lower end of the support rod 6 as shown in FIG. 4. For the purpose of time saving, it is preferable that the aluminum elongation rod 7 is attached to the lower end of the support rod 6 once the distortion of the optical fiber base material 1 starts to be corrected. In this case, the distortion is considered to have been corrected when the difference between the end of the dummy rod 1c and the elongation axis reaches 10 mm or less.

Figure 5:
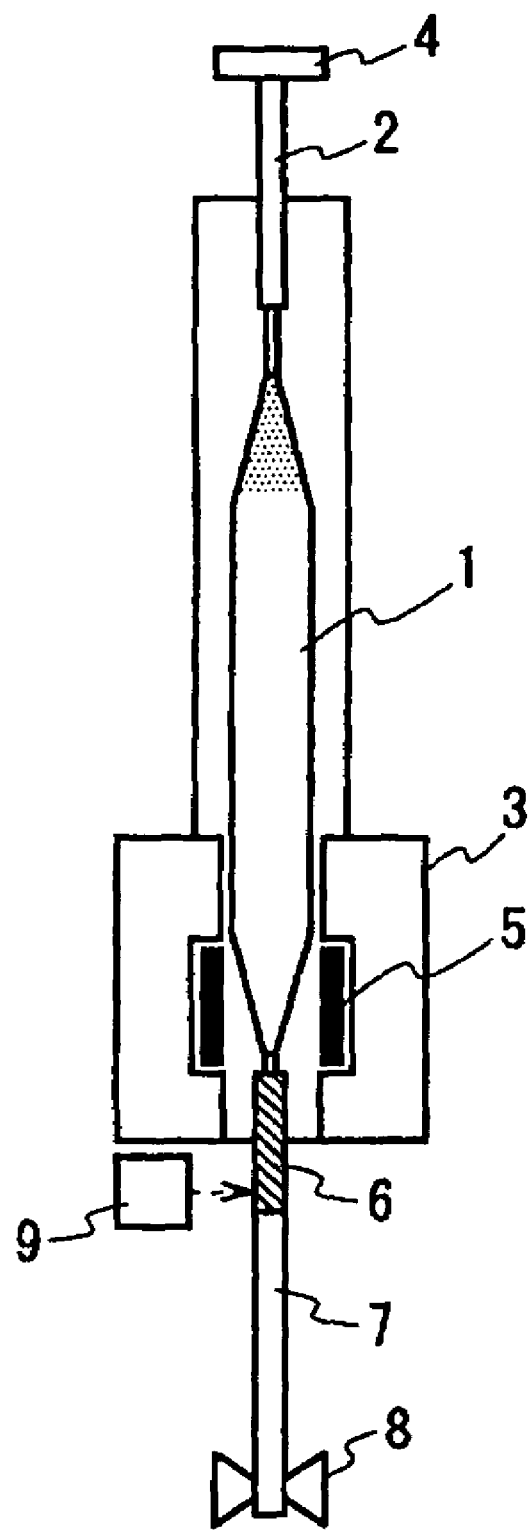
FIG. 5 is a schematic vertical cross-sectional view illustrating that an optical fiber base material having a large outer diameter is elongated.

After this, the optical fiber base material 1 is elongated so that the diameter of the optical fiber base material 1 is reduced to a predetermined value. This is achieved in such a manner that the optical fiber base material 1 is moved downwards at a predetermined rate by operating the hanging mechanism 4, and at the same time, that the aluminum elongation rod 7 positioned the lowest is held by a chuck 8 and moved downwards as shown in FIG. 5.

INDUSTRIAL APPLICABILITY

An elongating method of an optical fiber base material according to an aspect of the invention can easily produce an optical fiber base material which does not have distortion and can be subjected to drawing excellently. The produced optical fiber base material is so accurately straight that it can be used for a glass rod, and is excellently applicable to a variety of uses.

The invention claimed is:

1. An elongating method of an optical fiber base material, wherein, in an elongating process of elongating an optical fiber base material by heating the optical fiber base material in a heating furnace such that a diameter of the optical fiber base material is reduced, before the optical fiber base material having a distorted portion is elongated from an end thereof, the distorted portion of the optical fiber base material is corrected by being heated to be softened in the heating furnace such that the distorted portion is corrected by its own weight, wherein the elongation is started after the optical fiber base material is attached to a hanging mechanism such that said optical fiber base material is hung in the heating furnace, after the distorted portion of the optical fiber base material is heated to be softened, and after a difference between an elongation axis and an end of one of the optical fiber base material and a dummy rod attached to the optical fiber base material is reduced and judged to be 10 mm or less.

2. The elongating method according to claim 1, wherein when the optical fiber base material is heated to be softened in the heating furnace, a heater to heat the heating furnace is heated to a temperature in a range of 1,800° C. to 1,900° C.

3. The elongating method according to claim 1, wherein the optical fiber base material is hung in such a manner that the distorted portion is positioned lower and the elongation axis is substantially parallel to a plumb direction.

4. The elongating method according to claim 1, comprising:
examining whether the optical fiber base material is to be hung in the heating furnace without being in contact with the heating furnace, before the optical fiber base material is hung.

5. The elongating method according to claim 1, wherein the difference is detected by using a noncontact position detecting apparatus.

6. The elongating method according to claim 5, wherein the noncontact position detecting apparatus is one of a laser measuring device and an image processing apparatus.

7. The elongating method according to claim 1, wherein the difference is detected by using noncontact position detecting apparatus.

8. A method of elongating an optical fiber base material, comprising:
correcting a distorted portion of the optical fiber base material by heating the optical fiber base material to soften the distorted portion, the distorted portion being softened such that the distorted portion is corrected by its own weight; and
after the correcting of the distorted portion, elongating the optical fiber base material from an end thereof,
wherein a difference between an elongation axis and an end of one of the optical fiber base material and a dummy rod attached to the optical fiber base material is reduced and judged to be 10 mm or less.

9. The meted of elongating according to claim 8, further comprising:
hanging the optical fiber base material in a heating furnace for the heating of the optical fiber base material such that the optical fiber base material and the heating furnace do not make physical contact.

10. The method of elongating according to claim 8, wherein the difference is detected by using a charge-coupled device camera.

11. The method of elongating according to claim 8, wherein the optical fiber base material comprises an outer diameter of 40 mm to 180 mm.

12. The method of elongating according to claim 8, wherein the optical fiber base material comprises quartz glass.

13. The method of elongating according to claim 8, wherein an elongation support rod made of silicon nitride ceramics is attached to the dummy rod.

14. The elongating method according to claim 9, wherein the dummy rod projects from the heating furnace.

15. The elongating method according to claim 8, wherein a charge-coupled device camera measures a position of the elongation axis on an image in advance, and obtains an image of the dummy rod in a direction perpendicular to the elongation axis of the optical fiber base material.

* * * * *